United States Patent
Rübenacker et al.

(10) Patent No.: US 6,174,946 B1
(45) Date of Patent: Jan. 16, 2001

(54) AGGLOMERATED PARTICLES OF WATER-SWELLABLE ADDITION POLYMERS, PREPARATION THEREOF AND USE THEREOF

(75) Inventors: Martin Rübenacker, Altrip; Reinhard Schneider, Fussgönheim; Jürgen Nieberle; Harald Meyer, both of Wachenheim; Heinrich Hartmann, Limburgerhof, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 08/894,373

(22) PCT Filed: Feb. 10, 1996

(86) PCT No.: PCT/EP96/00577

§ 371 Date: Aug. 22, 1997

§ 102(e) Date: Aug. 22, 1997

(87) PCT Pub. No.: WO96/26222

PCT Pub. Date: Aug. 29, 1996

(30) Foreign Application Priority Data

Feb. 23, 1995 (DE) ................................. 195 06 287

(51) Int. Cl.$^7$ ................... C08J 3/12; C08F 2/37
(52) U.S. Cl. .................. 524/244; 524/245; 524/317; 524/375; 524/376; 524/377; 528/501
(58) Field of Search ................ 524/244, 245, 524/317, 375, 376, 377; 528/501

(56) References Cited

U.S. PATENT DOCUMENTS 5,346,986 * 9/1994 Schneider .

FOREIGN PATENT DOCUMENTS

| 36 41 700 C3 | 3/1994 | (DE) . |
|---|---|---|
| 0 343 840 A2 | 11/1989 | (EP) . |
| WO A1 9213912 | 8/1992 | (WO) . |

* cited by examiner

*Primary Examiner*—David J. Buttner
(74) *Attorney, Agent, or Firm*—Oblon, Spivak, McClelland, Maier & Neustadt, P.C.

(57) ABSTRACT

Agglomerated particles of water-swellable addition polymers, the agglomerated particles having an average particle diameter of from 20 to 5000 $\mu$m and consisting of primary particles having an average particle diameter of from 0.1 to 15 $\mu$m, being preparable by polymerization of water-soluble monomers in the presence of from 1' to 10% by weight of a regulator and at least 2000 ppm, each based on the monomers, of a crosslinking agent in the manner of a water-in-oil polymerization and subsequent azeotropic removal of water from the water-in-oil polymer emulsions, containing the primary particles, in the presence of agglomerating polyalkylene glycols which (a) are obtainable by an addition reaction of $C_2$–$C_4$-alkylene oxides with alcohols, phenols, amines or carboxylic acids, and (b) contain at least 2 polymerized alkylene oxide units, and disintegrating into the primary particles on introduction into an aqueous medium, processes for preparing the agglomerated polymer particles and use of the agglomerated particles as thickeners for print pastes.

4 Claims, No Drawings

AGGLOMERATED PARTICLES OF WATER-SWELLABLE ADDITION POLYMERS, PREPARATION THEREOF AND USE THEREOF

BACKGROUND OF THE INVENTION

1. Field of the Invention

The present invention relates to agglomerated particles of water-swellable addition polymers, the agglomerated particles having an average particle diameter of from 20 to 5000 µm and consisting of primary particles having an average particle diameter of from 0.1 to 15 µm, being preparable by polymerization of water-soluble monomers in the presence of regulators and of crosslinking agents in the manner of a water-in-oil polymerization and subsequent azeotropic removal of water from the water-in-oil polymer emulsions, containing the primary particles, in the presence of agglomerating polyalkylene glycols which (a) are obtainable by an addition reaction of $C_2$–$C_4$-alkylene oxides with alcohols, phenols, amines or carboxylic acids, and (b) contain at least 2 polymerized alkylene oxide units, and disintegrating into the primary particles on introduction into an aqueous medium, to processes for preparing the agglomerated polymer particles, and to their use as thickeners for increasing the viscosity of aqueous systems.

2. Description of the Background

DE-C-36 41 700 discloses a process for preparing water-in-oil emulsions of crosslinked, water-swellable addition polymers by polymerizing water-soluble monomers and crosslinkers in the form of a water-in-oil emulsion using water-soluble azo initiators in the presence of emulsifiers having an HLB value of at least 10. The polymers are not isolated, but are used directly in the form of the water-in-oil polymer emulsions as thickeners, for example for preparing textile print pastes.

EP-A-0 343 840 discloses finely divided crosslinked addition polymers having a particle size of <20 µm. They are prepared by polymerizing water-soluble monomers together with crosslinkers in the manner of a water-in-oil polymerization in the presence of free-radical polymerization initiators. The polymers are again not isolated; instead, the water is merely substantially distilled out of the emulsions and the emulsions are subsequently admixed with an oil-in-water emulsifier to facilitate dispersion of the mixture in water. The polymers are used as thickeners in pigment print pastes. In pigment printing, the thickener remains on the printed textile material together with the binder of the pigment print paste. However, the above-described thickeners are not suitable for textile printing with print pastes which contain soluble dyes, such as reactive dyes or disperse dyes, since such textile prints are subsequently washed and the thickener is not completely removable. The known thickeners remain on the textile material and give it a harsh hand. The known thickeners are also electrolyte-sensitive, so that they are not sufficiently effective on printing with reactive dyes, where the print pastes contain relatively large amounts of salts as well as the ionic dye.

WO-A-92/13912 discloses the agglomerated polymer particles described at the beginning. The agglomerated polymer particles are present in the form of a powder. The crosslinked, water-swellable polymer powders are used as thickeners for aqueous systems, in particular as thickeners for textile print pastes. However, these polymers have the disadvantage that they cannot be washed off and so impart too harsh a hand to the printed material.

SUMMARY OF THE INVENTION

It is an object of the present invention to provide novel substances which, on use as thickeners for printing with soluble dyes, are readily washed out of the printed material and which exhibit a good thickening effect in electrolyte-containing print pastes.

We have found that this object is achieved according to the present invention by agglomerated particles of water-swellable addition polymers, the agglomerated particles having an average particle diameter of from 20 to 5000 µm and consisting of primary particles having an average particle diameter of from 0.1 to 15 µm, being preparable by polymerization of water-soluble monomers in the presence of regulators and of crosslinking agents in the manner of a water-in-oil polymerization and subsequent azeotropic removal of water from the water-in-oil polymer emulsions, containing the primary particles, in the presence of agglomerating polyalkylene glycols which (a) are obtainable by an addition reaction of $C_2$–$C_4$-alkylene oxides with alcohols, phenols, amines or carboxylic acids, and (b) contain at least 2 polymerized alkylene oxide units, and disintegrating into the primary particles on introduction into an aqueous medium, when the water-in-oil polymerization is carried out using the regulators in amounts from 1 to 10% by weight and the crosslinkers in amounts of at least 2000 ppm, each based on the monomers.

The present invention also provides a process for preparing the abovementioned agglomerated polymer particles by polymerizing water-soluble monomers in the aqueous phase of a water-in-oil emulsion in the presence of water-in-oil emulsifiers, polymerization initiators, regulators and crosslinkers and subsequent azeotropic removal of water from the water-in-oil polymer emulsions in the presence of from 1 to 40% by weight, based on the monomers, of agglomerating polyalkylene glycols which (a) are obtainable by an addition reaction of $C_2$–$C_4$-alkylene oxides with alcohols, phenols, amines or carboxylic acids, and (b) contain at least 2 polymerized alkylene oxide units, by agglomeration of the primary particles of the water-in-oil polymer emulsions and isolating the agglomerated polymer particles, by using the regulators in amounts from 1 to 10% by weight and the crosslinkers in amounts of at least 2000 ppm, each based on the monomers.

DETAILED DESCRIPTION OF THE INVENTION

The polymerization can be carried out with all water-soluble ethylenically unsaturated monomers. These monomers are for example ethylenically unsaturated $C_3$–$C_6$-carboxylic acids, such as acrylic acid, methacrylic acid, itaconic acid, maleic acid, fumaric acid and methacrylic acid and also the amides thereof, especially acrylamide and methacrylamide. Further suitable water-soluble monomers are for example acrylamidomethylpropanesulfonic acid, vinylsulfonic acid, vinylphosphonic acid and vinyllactic acid.

Further suitable water-soluble ethylenically unsaturated monomers are di-$C_1$–$C_3$-alkylamino-$C_2$–$C_6$-alkyl (meth)acrylates, such as dimethylaminoethyl acrylate, dimethylaminoethyl methacrylate, diethylaminoethyl acrylate, diethylaminoethyl methacrylate, dimethylaminopropyl acrylate, dimethylaminobutyl acrylate, dimethylaminoneopentyl acrylate and dimethylaminoneopentyl methacrylate.

The basic acrylates can be subjected to the polymerization in the form of the salts with inorganic acids or carboxylic acids having from 1 to 4 carbon atoms or else in quaternized form. Also suitable are olefinically unsaturated nitriles, such as acrylonitrile.

It is also possible to use water-soluble diallylammonium compounds of the general formulae

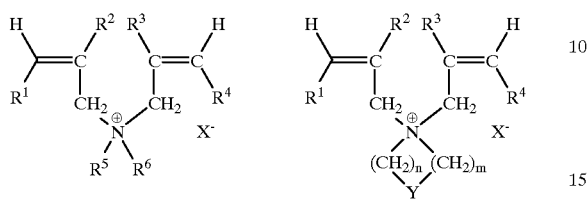

where X⁻ is a halide ion, such as chloride, fluoride, bromide or iodide, or a hydroxide, nitrate, methosulfate, hydrogensulfate or dihydrogenphosphate ion, n and m are each integers from 1 to 2, preferably n=m=2, Y is

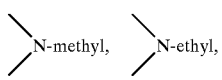

preferably an oxygen atom or a

group, and $R^1$, $R^2$, $R^3$ and $R^4$ are each a hydrogen atom or an alkyl radical having from 1 to 6 carbon atoms and $R^5$ and $R^6$ are each H or an alkyl radical, which can be straight-chain or branched, having from 1 to 18 carbon atoms, preferably from 1 to 6 carbon atoms, or an aryl and/or benzyl radical.

Such diolefinically unsaturated monomers include for example dimethyldiallylammonium chloride, dimethyldiallylammonium bromide, diethyldiallylammonium chloride, methyl-tert-butyldiallylammonium methosulfate, methyl-n-propyldiallylammonium chloride, dimethyldiallylammonium hydrogensulfate, dimethyldiallylammonium dihydrogenphosphate, di-n-butyldiallylammonium bromide, diallylpiperidinium bromide, diallylpyrrolidinium chloride and diallylmorpholinium bromide.

It is also possible to use N-vinylpyrrolidones, such as N-vinylpyrrolidone. It is also possible to use N-vinylformamide as water-soluble monomer. It is either polymerized alone or copolymerized in mixture with other ethylenically unsaturated monomers, for example with N-vinylpyrrolidone, acrylamide, methacrylamide, vinyl acetate, N-vinylimidazole, N-vinylimidazoline and/or dimethylaminoethyl acrylate.

Other suitable water-soluble monomers include N-vinylimidazolium compounds which can be characterized for example with the aid of the following formula:

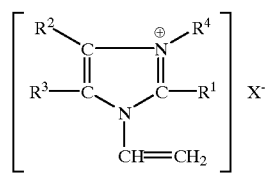

where $R^1$, $R^2$ and $R^3$ may each be H or $CH_3$ and $R^1$ may also be $C_2H_5$, $C_3H_7$ or $C_4H_9$, $R^4$ may be H, $C_1$–$C_6$-alkyl, benzyl or

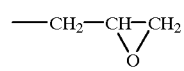

and X⁻ may be an anion, such as Cl⁻, Br⁻, I⁻, methosulfate, ethosulfate, acetate, sulfate, hydrogensulfate or dihydrogenphosphate. Of this class of compounds, the unsubstituted N-vinylimidazole in salt form is preferred. Further suitable water-soluble monomers include N-vinylimidazolines which can be characterized for example with the aid of the following general formula:

(I)

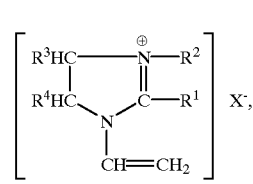

where
$R^1$=H, $C_1$–$C_{18}$-alkyl,

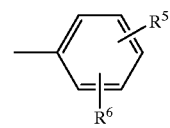

$R^5$, $R^6$=H, $C_1$–$C_4$-alkyl, Cl,
$R^2$=H, $C_1$–$C_{18}$-alkyl,

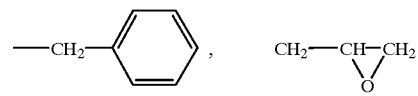

$R^3$, $R^4$=H, $C_1$–$C_4$-alkyl, and
X⁻ is an acid radical.

Of this group of compounds, the polymerization is preferably carried out with 1-vinyl-2-imidazoline salts of the formula II

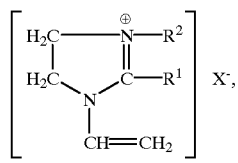

(II)

where
R¹ is H, CH₃, C₂H₅, n- and i—C₃H₇, C₆H₅, and
X⁻ is an acid radical. X⁻ is preferably Cl⁻, Br⁻, SO₄²⁻, HSO₄⊖, H₂PO₄⊖, CH₃O—SO₃⁻, C₂H₅—O—SO₃⁻, R¹—COO⁻ and R²=H, C₁-C₄-alkyl or aryl.

The substituent X⁻ in the formulae I and II can in principle be any desired acid radical of an inorganic or organic acid. The monomers of the formula I are obtained by neutralizing the free base, i.e. 1-vinyl-2-imidazolines, with the equivalent amount of an acid. The vinylimidazolines can also be neutralized with, for example, trichloroacetic acid, benzenesulfonic acid or toluenesulfonic acid. As well as salts of 1-vinyl-2-imidazolines it is possible to use quaternized 1-vinyl-2-imidazolines. They are prepared by reacting 1-vinyl-2-imidazolines, which may be substituted in positions 2, 4 and 5, with known quaternizing agents. Suitable quaternizing agents include for example C₁-C₁₈-alkyl chlorides or bromides, benzyl chloride, benzyl bromide, epichlorohydrin, dimethyl sulfate and diethyl sulfate. The preferred quaternizing agents are epichlorohydrin, benzyl chloride, dimethyl sulfate and methyl chloride.

Preferable water-soluble ethylenically unsaturated monomers are acrylic acid, methacrylic acid, acrylamide, methacrylamide, 2-acrylamido-2-methylpropanesulfonic acid, N-vinylimidazole, N-vinylformamide, hydroxyethyl acrylate, hydroxypropyl acrylate, N-methylolacrylamide or mixtures thereof. The monomers can either be polymerized alone to form homopolymers or else be polymerized in mixture with one another to form copolymers. Of particular interest are for example copolymers of acrylamide and acrylic acid, copolymers of acrylamide and methacrylic acid, copolymers of methacrylamide and acrylic acid, copolymers of methacrylamide and methacrylic acid, copolymers of acrylamide, acrylic acid and 2-acrylamido-2-methylpropanesulfonic acid, copolymers of acrylamide and dimethylaminoethyl acrylate, copolymers of acrylamide and diethylaminoethyl methacrylate, and copolymers of methacrylamide and dimethylaminoethyl acrylate. The carboxylic acids and the other ethylenically unsaturated acids, such as vinylsulfonic acid and acrylamidomethylpropane sulfonic acid, can be used in the polymerization either in the form of the free acid, in partially neutralized or else in completely neutralized form. The bases used for neutralizing these monomers are for example sodium hydroxide solution, potassium hydroxide solution, ammonia, amines, such as triethylamine, butylamine, triethylamine, morpholine and ethanolamine.

The basic acrylates and methacrylates are preferably used in the homo- or copolymerization as salt or in quaternized form. The basic acrylates and methacrylates are neutralized for example with the aid of hydrochloric acid, hydrobromic acid, sulfuric acid, phosphoric acid and carboxylic acids, such as formic acid, acetic acid and propionic acid. The basic acrylates and methacrylates are also used in quaternized form. The quaternization products are obtained by quaternizing these compounds with customary quaternizing agents, such as methyl chloride, ethyl chloride, benzyl chloride, lauryl chloride, dimethyl sulfate, diethyl sulfate or epichlorohydrin.

The polymerization of the water-soluble monomers is carried out in the presence of at least 2000 ppm, based on all the monomers used, of crosslinkers. The crosslinkers contain at least two unconjugated, ethylenically unsaturated double bonds. Suitable crosslinkers include for example N,N'-methylenebisacrylamide, polyethylene glycol diacrylates and polyethylene glycol dimethacrylates, which are each derived from polyethylene glycols having a molecular weight of from 126 to 8500, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, doubly or triply acrylated or methacrylated adducts of ethylene oxide and/or propylene oxide with trimethylolpropane, at least doubly acrylated or methacrylated polyhydric alcohols, such as glycerol or pentaerythritol, triallylamine, tetraallylethylenediamine, divinylbenzene, diallyl phthalate, polyethylene glycol divinyl ether, trimethylolpropane diallyl ether, polyethylene glycol divinyl ether, butanediol divinyl ether, pentaerythritol triallyl ether and/or divinylethyleneurea and/or triallylmonoalkylammonium salts, for example triallylmethylammonium chloride. Preference is given to using water-soluble crosslinkers, for example N,N'-methylenebisacrylamide, polyethylene glycol diacrylates, polyethylene glycol dimethacrylates, pentaerythritol triallyl ether and/or divinylurea. The crosslinkers are used in an amount of at least 1000 ppm, preferably from 0.20% to 10% by weight, based on the total amount of monomers used in the polymerization. The crosslinkers are used with particular preference in amounts from 0.2 to 0.5% by weight, based on the monomers.

The polymerization of the water-soluble monomers is carried out in the presence of at least 1000 ppm of at least one crosslinker and at least 1% by weight of at least one regulator, the stated amounts each being based on the monomers used. The regulator(s) used can be the compounds customarily suitable for this purpose, which limit the molecular weight of polymers being polymerized, for example alcohols, salts of hydrazine and of hydroxylamine, formic acid, alkali metal and ammonium salts of formic acid and organic compounds which contain sulfur in bonded form such as, respectively organic, sulfides, disulfides, polysulfides, sulfoxides, sulfones and mercapto compounds. The following polymerization regulators are mentioned by way of example: di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, diethanol sulfide, di-t-butyl trisulfide and dimethyl sulfoxide. Preferable polymerization regulators are mercapto compounds, dialkyl sulfides, dialkyl disulfides and/or diaryl sulfides. Examples of these compounds are ethyl thioglycolate, cystein, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioglycerol, thioacetic acid, thiourea and alkyl mercaptans such as n-butyl mercaptan, n-hexyl mercaptan or n-dodecyl mercaptan. Particularly preferable polymerization regulators are isopropanol, formic acid and its alkali metal and ammonium salts, thioglycolic acid and its alkali metal and ammonium salts and also all regulators which have a similar transfer constant to thioglycolic acid. The polymerization regulators are preferably used in amounts of from 0.25 to 10% by weight, based on the monomers used in the polymerization. The polymerization can of course also be carried out with mixtures of polymerization regulators.

In order to polymerize the monomers, they are first dissolved in water. The concentration of the monomers in the aqueous solution is from 20 to 80, preferably from 30 to 60, % by weight. The aqueous solution is then emulsified in an inert hydrophobic liquid (oil phase) in the presence of at least one water-in-oil emulsifier with formation of a water-in-oil emulsion. Virtually all water-immiscible liquids which do not interfere in the polymerization may be used as inert hydrophobic liquids. Aliphatic and aromatic hydrocarbons or mixtures of aliphatic and aromatic hydrocarbons are preferably used for this purpose. Suitable aliphatic hydrocarbons are, for example, pentane, hexane, heptane, octane, nonane, decane, cyclohexane, decalin, methylcyclohexane, isooctane and ethylcyclohexane. Aromatic hydrocarbons which are used as the hydrophobic liquid in the reverse suspension polymerization are, for example, benzene, toluene, xylene and isopropylbenzene. It is of course also possible to use halohydrocarbons, such as tetrachloroethane, hexachloroethane, trichloroethane and chlorobenzene. Cyclohexane or hydrocarbons boiling within the range from 60 to 170° C. are preferably used. The oil phase accounts for from 15 to 70, preferably from 20 to 60, % by weight of the water-in-oil polymer emulsion.

The relevant known water-in-oil emulsifiers are used for dispersing the aqueous monomer solution in the oil phase. These are, for example, sorbitan esters, such as sorbitan monostearate, sorbitan monooleate, sorbitan palmitate and sorbitan laurate, and glyceryl esters whose acid component is derived from $C_{14}$–$C_{20}$ carboxylic acids. Further suitable emulsifiers are the water-in-oil emulsifiers which are disclosed in DE-B-25 57 324 and are obtainable by reacting A) $C_{10}$–$C_{22}$-fatty alcohols with epichlorohydrin in a molar ratio of from 1:0.5 to 1:1.5 to give glycidyl ethers, B) reacting the glycidyl ethers with (1) saturated $C_2$–$C_6$-alcohols containing from 2 to 6 OH groups or (2) monoethers thereof with $C_{10}$–$C_{22}$-fatty alcohols, in a molar ratio of glycidyl ether to (1) or (2) of from 1:0.5 to 1:6 in the presence of acids or bases, and C) alkoxylating the reaction products according to (B) with at least one $C_2$–$C_4$-alkylene oxide in a molar ratio of from 1:1 to 1:6.

Further suitable emulsifiers are constructed from at least one hydrophilic and at least one hydrophobic block, the blocks each having molecular weights of more than 500 to 100,000, preferably from 550 to 50,000, very particularly preferably from 600 to 20,000. The emulsifiers can have a comblike or linear construction. Linear block copolymers of the type AB or of the type ABA, where A is a hydrophobic polymer block and B is a hydrophilic polymer block, are known; cf. EP-A-0 000 424 and EP-A-0 623 630. Preferably the emulsifiers to be used are soluble in the water-immiscible solvent used.

The hydrophilic blocks are separately soluble in water at 25° C. to more than 1%, preferably 5% by weight. Examples are blocks constructed from ethylene oxide, propylene oxide or butylene oxide units, optionally intermixed. The hydroxyl groups of the alkylene oxide blocks can be additionally modified by sulfate or phosphate ester groups. Suitable further blocks are derived from polytetrahydrofuran, poly (1,3-dioxolane), poly(2-methyl-2-oxazoline), polyethyleneimine, polyvinyl alcohol, polyvinylamine, polyvinylpyrrolidone, poly(meth)acrylic acid, polyamidoamines, gelatin, cellulose derivatives or starch.

Particular preference is given to blocks based on ethylene oxide and/or propylene oxide units.

The hydrophobic parts of the emulsifiers consist for example of blocks of polystyrene, polyalkyl (meth) acrylates, polysiloxanes, poly(hydroxyalkanoic acids) such as polycondensates of 2-hydroxypropanoic acid, 2-hydroxybutanoic acid, 2-hydroxyisobutanoic acid, 2-hydroxyheptanoic acid, 10-hydroxydecanoic acid, 12-hydroxydodecanoic acid, 12-hydroxystearic acid, 16-hydroxyhexadecanoic acid, 2-hydroxystearic acid, 2-hydroxyvaleric acid or the corresponding condensates obtained from lactones, condensates of diols and dicarboxylic acids such as polyethylene adipate, polylactams such as polycaprolactam, polyisobutylene or polyurethanes. Preference is given to blocks of polystyrene, polymethyl methacrylate, polybutyl methacrylate, polyhydroxyalkanoic acids having more than 10 carbon atoms in the alkane unit, polydimethylsiloxanes or polyisobutylenes. Very particular preference is given to blocks of polystyrene, polyhydroxy fatty acids such as poly(12-hydroxystearic acid) or polydimethylsiloxanes.

Of these compounds, preference for use as emulsifier is given to those block copolymers where A is a hydrophobic polymer block selected from the group consisting of polystyrene, poly(hydroxycarboxylic acids), polydimethylsiloxanes and polyisobutylenes, and B is a hydrophilic polymer block from the group of the $C_2$–$C_4$-polyalkylene glycols.

The suitable water-in-oil emulsifiers have an HLB value of not more than 8. The HLB value is understood as meaning the hydrophilic/lipophilic balance of the emulsifier, cf. W. C. Griffin, J. Soc. Cosmet. Chem. 1 (1949), 311. The water-in-oil emulsifiers are used in an amount of from 2 to 20, preferably from 5 to 15, % by weight, based on the monomers used. The water-in-oil emulsifiers described in the stated DE-B-25 57 324 are preferably used.

Suitable free radical polymerization initiators which may be used are all conventionally used polymerization initiators. Water-soluble initiators, such as alkali metal or ammonium peroxodisulfates, hydrogen peroxide, diacetyl peroxodicarbonate, dicyclohexyl peroxodicarbonate, tert-butyl perpivalate, dilauroyl peroxide, dibenzoyl peroxide, tert-butyl per-2-ethylhexanoate, tert-butyl permaleate, bis (tert-butylperoxo)cyclohexane, tert-butyl peracetate, dicumyl peroxide, di-tert-amyl peroxide, di-tert-butyl peroxide, cumyl hydroperoxide, tert-butyl hydroperoxide and p-menthane hydroperoxide, and azo initiators, such as 2,2'-azobis(2-methyl-N-phenylpropionamidine) dihydrochloride, 2,2'-azobis(2-methylpropionamidine) dihydrochloride, 2,2'-azobis(2,4-dimethylvaleronitrile), 2,2'-azobis(isobutyronitrile), 2,2'-azobis(2-amidinopropane) dihydrochloride and 2,2'-azobis [2-(2-imidazolin-2-yl) propane] dihydrochloride, are preferred. Preferred initiators are alkali metal and ammonium persulfates, tert-butyl perpivalate, tert-butyl per-2-ethylhexanoate, 2,2'-azobis(2,4-dimethylvaleronitrile), 2,2'-azobis(2-amidinopropane) dihydrochloride, azobis(isobutyronitrile) and 2,2'-azobis[2-(2-imidazolin-2-yl)propane] dihydrochloride. It is possible to use either a single initiator or a mixture of a plurality of initiators. The choice of the initiators depends primarily on the temperature at which the polymerization is carried out. Salts of heavy metals, for example copper, cobalt, manganese, iron, nickel and chromium salts, and/or organic compounds, such as benzoin, dimethylaniline or ascorbic acid, and reducing agents, for example alkali metal disulfite or sodium formaldehyde sulfoxylate, may additionally be used together with at least one of the abovementioned free radical polymerization initiators. Such mixtures of initiators permit polymerization at lower temperatures. The reducing component of redox initiators may be, for example, sodium sulfite, sodium bisulfite, sodium formaldehyde sulfoxylate or hydrazine. From 100 to 10,000 ppm, preferably from 100 to 2000 ppm, based on the monomers used in the polymerization, of a polymerization initiator or of a mixture of a plurality of polymerization initiators are required. The stated amounts of initiator correspond to about 0.002–0.3 mol %, based on the monomers used, of initiator.

The polymerization of the water-soluble monomers is preferably carried out in the additional presence of at least one oil-in-water emulsifier. The use of this group of emulsifiers permits the preparation of particularly finely divided water-in-oil polymer emulsions which are stable to sedimentation. Examples of suitable oil-in-water emulsifiers are all wetting agents which have an HLB value of at least 10. This group of emulsifiers comprises essentially hydrophilic water-soluble compounds, such as ethoxylated alkylphenols or ethoxylated fatty alcohols. Products of this type are obtained, for example, by reacting $C_8$–$C_{12}$-alkylphenols or $C_8$–$C_{22}$-fatty alcohols with ethylene oxide. Preferably, $C_{12}$–$C_{18}$-fatty alcohols are ethoxylated. The molar ratio of alkylphenol or fatty alcohol to ethylene oxide is in general from 1:5 to 1:20. Further suitable emulsifiers are, for example, alkoxylated fatty amines. If the emulsifiers having an HLB value of 10 or higher are used in the polymerization, they are employed, for example, in amounts of from 1 to 20, preferably from 2 to 15, % by weight, based on the monomers to be polymerized.

The polymerization of the monomers is carried out in the aqueous phase of a water-in-oil emulsion in the presence of water-in-oil emulsifiers and optionally protective colloids which are customarily used in the inverse suspension polymerization and. optionally oil-in-water emulsifiers and also in the presence of free radical polymerization initiators.

The water-in-oil polymer emulsions are azeotropically stripped of water in the presence of agglomerating polyalkylene glycols.

The removal of water from the water-in-oil polymer emulsions is carried out under the conditions indicated in WO-A-92/13912. The azeotropic removal of water leaves agglomerations of primary particles which, according to sieve analysis, have an average particle diameter of from about 20 to 5000, preferably from 50 to 2500, µm. The agglomerated polymer particles contain primary particles having an average particle diameter of from 0.1 to 15 µm. The water present in the water-in-oil polymer emulsions is removed by azeotropic distillation to at least 80%, preferably to an extent of up to 95–99%. Small amounts of water which remain in the polymers present no problems. On introducing agglomerated particles dried by azeotropic distillation into water they disintegrate into the primary particles.

The polyalkylene glycols which are suitable as agglomeration assistants are obtainable, for example, by subjecting the suitable alkylene oxides, ie. ethylene oxide, propylene oxide, 1,2-butylene oxide or isobutylene oxide, and tetrahydrofuran to an addition reaction with alcohols, phenols, amines or carboxylic acids. The stated alkylene oxides and tetrahydrofuran may be polymerized either alone or as a mixture. If mixtures are used, polymeric compounds in which the alkylene oxide units are randomly distributed are obtained. However, the alkylene oxides may also be reacted in a conventional manner to give block copolymers. Homopolymers of ethylene oxide are obtained, for example, by subjecting ethylene oxide to an addition reaction with ethylene glycol. For the preparation of homopolymers of propylene oxide, propylene oxide is subjected to an addition reaction with 1,2-propylene glycol, 1,3-propylene glycol or a mixture of the stated isomers. The homopolymers of other alkylene oxides are prepared in a corresponding manner.

Block copolymers are prepared, for example, by first subjecting ethylene oxide to an addition reaction with ethylene glycol and allowing the reaction to go to completion and then subjecting propylene oxide to an addition reaction with the product under the conventional conditions, ie. by catalysis with alkali metal hydroxides or calcium oxide. Here, there are many possibilities for varying the sequence of the blocks of alkylene oxide units. For example, an ethylene oxide block may be followed by a propylene oxide block and the latter by an ethylene oxide block. Polyalkylene glycols which contain an ethylene oxide block, a propylene oxide block and a butylene oxide block or polyalkylene glycols in which a propylene oxide block is followed by an ethylene oxide block or polyalkylene oxides in which a butylene oxide block is followed by a propylene oxide block and, if desired, an ethylene oxide block may also be used as agglomeration assistants.

The terminal groups of the polyalkylene glycols thus formed may be blocked at one or both ends. Polyalkylene glycols blocked at one end are obtained, for example, by subjecting alkylene oxides to an addition reaction with alcohols, phenols, amines or carboxylic acids. Examples of suitable alcohols are monohydric $C_1$–$C_{22}$-alcohols, for example methanol, ethanol, n-propanol, isopropanol, n-butanol, isobutanol, n-octanol, isooctanol and stearyl alcohol. Polyhydric alcohols, for example as stated above, ethylene glycols or propylene glycols and glycerol, pentaerythritol and 1,6-hexanediol, may also be used as alcohols. The alkylene oxides may also be subjected to an addition reaction with phenol and substituted phenols, such as $C_1$–$C_{18}$-alkylphenols. Amines are also suitable for blocking terminal groups, for example $C_1$–$C_{18}$-alkyl- or dialkylamines and diamines, preferably ethylenediamine. Commercial products which are obtainable, for example, by successive addition reactions of ethylene oxide and propylene oxide with ethylenediamine are of particular interest here. Thioalcohols, such as mercaptoethanol, mercaptopropanols and mercaptobutanols, may also be alkoxylated. The terminal OH groups of the polyalkylene glycols may also be replaced, for example, by amino groups. Further polyalkylene glycols which are suitable as agglomeration assistants are those whose terminal OH groups are etherified or esterified.

The suitable polyalkylene glycols contain at least 2 polymerized alkylene oxide units. Suitable agglomeration assistants are, for example, polyethylene glycols, polypropylene glycols, block copolymers comprising ethylene oxide and propylene oxide blocks and having the structure EO-PO, PO-EO-PO or EO-PO-EO, polyethylene glycols monoetherified or dietherified with $C_1$–$C_4$-alcohols and those compounds which are obtainable by subjecting first ethylene oxide and then propylene oxide, or first propylene oxide and then ethylene oxide, to an addition reaction with ethylenediamine. Suitable polyalkylene glycols which have an agglomerating effect are, for example, diethylene glycol, triethylene glycol, tetraethylene glycol, pentamethylene glycol, hexaethylene glycol, heptaethylene glycol, octaethylene glycol, diethylene glycol dimethyl ether, diethylene glycol monomethyl ether, diethylene glycol diethyl ether, diethylene glycol monoethyl ether, triethylene glycol mono- and dimethyl ether, triethylene glycol mono- and diethyl ether, dialkylene glycol dibutyl ether, diethylene glycol monobutyl ether, diethylene glycol monopropyl ether, diethylene glycol dipropyl ether, EO-PO block copolymers having average molecular weights of from 120 to 2 million, PO-EO-PO block copolymers having average molecular weights of from 178 to 2 million and EO-PO-EO block copolymers having average molecular weights of from 134 to 2 million, dipropylene glycol diacetate, diethylene glycol diacetate, dipropylene glycol monoacetate, diethylene glycol monoacetate, dipropylene glycol dimethyl ether and dipropylene glycol monomethyl ether. The stated molecular weights are number average molecular weights. The agglomeration assistants are preferably used in amounts of from 5 to 20% by weight, based on the polymer present in the water-in-oil emulsion.

After the azeotropic removal of water in the presence of the polyalkylene glycols, agglomerated polymer particles are present which can be readily isolated, for example by filtration, decanting of the hydrocarbon oil or centrifuging. Adhering hydrocarbon oil can readily be removed from the agglomerated polymer particles, for example by drying in a drying oven, preferably at relatively high temperatures and under reduced pressure.

The pulverulent agglomerated polymer particles are used as thickeners for increasing the viscosity of aqueous systems. They are suitable for example as thickeners for print pastes for printing textiles or else as thickeners for aqueous polymer dispersions which find utility for example as binders for paper coating compositions or as binders in paints. Particular preference is given to the use of the agglomerated polymer particles as thickeners in print pastes containing at least one reactive dye and/or a disperse dye. Those polymers with a monomer having an acid group, for example acrylic acid, methacrylic acid or 2-acrylamido-2-methylpropanesulfonic acid, are preferably used in the form of the sodium or potassium salts, or the polymers with the acid groups are preferably neutralized with sodium hydroxide solution or potassium hydroxide solution. The sodium or potassium salts of the polymers are particularly easy to wash off printed textiles compared with the corresponding ammonium salts.

The print pastes have the customary construction. Per 1000 parts by weight the finished print paste contains for example from 500 to 989 parts by weight of water, from 1 to 200 parts by weight of at least one reactive dye and/or at least one disperse dye and from 10 to 100 parts by weight of a thickener to be used according to the present invention. Reactive dyes and disperse dyes are commercially available. Disperse dyes are synthetic dyes which are sparingly soluble in water and which are commercially available in the form of fine suspensions stabilized with dispersions. On printing the dye particles diffuse into the fiber to form a solid solution therein.

Reactive dyes contain a reactive component (hook) as well as a chromophore. On printing the dye becomes attached through chemical reaction with functional groups of the fiber. Reactive dyes are described for example in detail in the Colour Index, 1982, $3^{rd}$ Edition, Vol. 5, published by the Society of Dyers and Colourists, H. Charlesworth & Co. Ltd., Huddersfield. To print and dye textile materials made of cellulose, the customary amounts of dyes and any assistants to be used are used in the customary amounts. The reactive dyes can have various reactive groups, or hooks, for example vinyl sulfone, monochlorotriazine or β-sulfatoethylsulfonyl groups. The dyes can belong to various dye classes, for example azo dyes, metal complex azo dyes, anthraquinone dyes, phthalocyanine dyes, phenacene and azomethine dyes.

EXAMPLES

Preparation of the Water-In-Oil Polymer Emulsions

Following DE-C-36 41 700, a 2 l capacity polymerization vessel equipped with horseshoe stirrer, thermometer, nitrogen inlet and nitrogen outlet is charged with the respectively below-described monomer emulsions. The polymerizable mixture is then emulsified for 30 min at room temperature under nitrogen at a stirrer speed of 200 rpm with half the amount of initiator. The reaction mixture is then heated to a temperature within the range from 55 to 70° C. and polymerized in that range for 1.5 h. Then the remainder of the initiator is added and the reaction mixture is heated at 65° C. for a further 2 h with stirring.

Example 1

The monomer emulsion is prepared by initially charging acrylic acid and neutralizing it with aqueous sodium hydroxide solution to a pH of 7. Then the other components are added together with sufficient aqueous sodium hydroxide solution so that the pH is 8. Sufficient water is then added for the total amount of the reaction mixture to be 1000 g.

Composition of the Monomer Emulsions in the Preparation of the W/O Polymer Emulsions Polymer 1
  308 g of cyclohexane
  17.6 g of a water-in-oil emulsifier obtainable by reaction of
    A) oleyl alcohol with epichlorohydrin in a molar ratio of 1:1 to form oleyl glycidyl ether,
    B) reaction of the oleyl glycidyl ether with glycerol in a molar ratio of 1:1 in the presence of $BF_3$-phosphoric acid at a temperature of 80° C. and removal of the catalyst with the aid of a basic ion exchanger, and
    C) ethoxylation of the reaction product of (B) with 2 mol of ethylene oxide,
  2.6 g of a surfactant obtainable by reaction of a $C_{13}/C_{15}$ oxo alcohol with 6 mol of ethylene oxide and 4 mol of propylene oxide,
  153.8 g of acrylic acid
  13.2 g of acrylamide
  13.2 g of N-vinylpyrrolidone
  3.6 g of thioglycolic acid
  0.08 g of penta sodium salt of diethylenetriaminepentaacetic acid
  0.36 g of methylenebisacrylamide
Initiator:
  0.092 g of 2,2'-azobis(2-amidinopropane) dihydrochloride
Polymer 2
  The composition differs from the composition of the monomer emulsion indicated for polymer 1 only in that no N-vinylpyrrolidone is used.
Polymer 3
  The preparation of polymer 1 is repeated except that acrylic acid and N-vinylpyrrolidone are used as monomers and the neutralization is carried out with potassium hydroxide solution.
Polymer 4
  The procedure for polymer 1 is repeated except that the 3.6 g of thioglycolic acid (20,000 ppm) are replaced by 5.4 g of formic acid (=25,000 ppm).

Comparison 1

This is the W/O polymer 1 indicated in WO-A-92/13912, which contains 92.1% of acrylic acid and 7.9% of acrylamide.

The above-described polymers 1 to 4 and the polymer of comparison 1 are each admixed with 10 g of an agglomerating polyethylene glycol having an average molecular weight of 300 and—as described in WO-A-92/13912—subjected to an azeotropic removal of water. After the water has been removed, the polymer suspensions are filtered and the agglomerated polymers are dried in a vacuum drying cabinet at 50° C. The agglomerated polymers 1 to 4 and the agglomerated polymer of Comparative Example 1 are obtained.

APPLICATION EXAMPLES

Example 1

410 g of the agglomerated polymer 1 are sprinkled into 7914 g of water of 15° German hardness with stirring. The agglomerated polymer is readily dispersible therein and does not clump. After 3 minutes of high speed stirring a homogeneous paste is obtained.

Then, with stirring, 1200 g of urea 250 g of sodium carbonate 100 g of sodium m-nitrobenzenesulfonate 100 g of the pulverulent blue reactive dye of CI No. 61205 are added in succession and the mixture is homogenized at 10,000 rpm for 3 min.

The product obtained is a print paste having a viscosity of 40 poise. The addition of the reactive dye brought about a decrease in the viscosity of 32 poise.

The print paste obtained was then printed with a rotary screen printing machine onto a cotton fabric. The printed fabric was dried at a temperature of 110° C. for 2 min and then fixed in saturated steam at 102° C. for 10 min. The fabric is subsequently rinsed in succession with water at 20° C. and water at 60° C. and boiled with a wash liquor which contains 2 g/l of an addition product of 8 mol of ethylene oxide with 1 mol of nonylphenol. After renewed rinsing at 20° C., the fabric is dried. The product obtained is a very strong, level and crisp print having good rub and wet fastness properties.

To evaluate the wash-off characteristics of the thickener, a strip of about 5×15 cm of the fixed, unwashed print is treated in distilled water at 80° C. in a tester from Ahiba AG (Switzerland), model WBRG 7. After 5 min the wet strip was removed from the instrument. It felt neither slippery nor slimy. The strip was dried at 110° C. for 2 min. It then had a very soft smooth hand.

Example 2

305 g of agglomerated polymer 1 are sprinkled into 9395 g of tap water of 15° German hardness with stirring. The polymer is readily dispersible and does not clump. After 3 minutes of high speed stirring a homogeneous paste is obtained. Then 300 g of the blue disperse dye C.I. Disperse Blue 87 in the liquid, 20% strength, nonionic finished commercial form are added with stirring and the batch is stirred with a high speed stirrer at 10,000 rpm for 3 min.

The print paste is then printed with a rotary screen printing machine onto a polyester satin fabric. The printed material is dried at 100° C. for 3 min and then subjected for 10 min to a superheated steam fixation at 170° C. The material is then rinsed with water at 20° C. and subsequently washed at 60° C. with a wash liquor containing 1 g/l of an addition product of 8 mol of ethylene oxide with 1 mol of nonylphenol and 1 g/l of 50% strength aqueous sodium hydroxide solution. After renewed rinsing at 20° C. the material is dried. The result obtained is a very strong, level and crisp print having good rub and wet fastness properties. The wash-off characteristics of the thickener from the printed material are tested as described in Example 1. After the 5 minute treatment in distilled water a wet test strip feels neither slippery nor slimy. The test strip is then dried at 110° C. for 2 min. It then had a very soft, smooth hand.

Examples 3 to 5

Example 1 was repeated with agglomerated polymers 2 to 4 in the amounts indicated in each case in the Table below.

TABLE

| Agglomerated polymer No. | Amount used | | Viscosity of print paste | Viscosity decrease on addition of dye |
| --- | --- | --- | --- | --- |
| | Thickener | Tap water | | |
| 2 | 380 g | 7970 g | 40 poise | 43 poise |
| 3 | 440 g | 7910 g | 40 poise | 28 poise |
| 4 | 410 g | 7940 g | 40 poise | 33 poise |

The prints and the wash-off characteristics are in all cases similar to those of Example 1.

Comparative Example 1

Example 1 was repeated by using 320 g of the agglomerated polymer of the comparison in 8030 g of water of 15° German hardness. The viscosity of the print paste was 40 poise, the decrease in the viscosity on addition of the dye was 43 poise. The prints are very similar to those of Example 1, but the wash-off characteristics of the thickener are poor. The wash-off characteristics were tested as indicated in Example 1. However, after a treatment of 5 min in the tester, the printed fabric was very slippery and greasy. The treatment was therefore continued for a further 15 min, but no improvement was obtained. The prints were still slippery. The fabric was then dried at 102° C. for 2 min. Afterwards it was stiff and had a harsh hand.

We claim:

1. Agglomerated particles of water-swellable additional polymers, the agglomerated particles having an average particle diameter of from 20 to 5000 μm and consisting of primary particles having an average particle diameter of from 0.1 to 15 μm, prepared by polymerization of water-soluble monomers in the presence of regulators and of cross linking agents in the manner of a water-in-oil polymerization and subsequent azeotropic removal of at least 80% of the water from the water-in-oil polymer emulsions, containing the primary particles, in the presence of agglomerating polyalkylene glycols, (a) said polyalkylene glycols are prepared by an addition reaction of $C_2$–$C_4$-alkylene oxides with alcohols, phenols, amines or carboxylic acids, and (b) contain at least 2 polymerized alkylene oxide units, and said agglomerated particles have the property of disintegrating into the primary particles on introduction into an aqueous medium, wherefore the water-in-oil polymerization is carried out using the regulators in amounts from 1 to 10% by weight and the crosslinkers in amounts of at least 1000 ppm, each based on the monomers.

2. A process for preparing agglomerated particles of water-swellable addition polymers as claimed in claim 1 comprising polymerizing water-soluble monomers in the aqueous phase of a water-in-oil emulsion in the presence of water-in-oil emulsifiers, polymerization initiators, regulators in amounts from 1–10% by weight and crosslinkers in amounts of at least 1000 ppm, each based on the total amount of monomer, followed by azeotropic removal of at least 80% of the water from the water-in-oil polymer emulsions in the presence of from 1 to 40% by weight, based on the polymers, of agglomerating polyalkylene glycols which (a) are obtained by an addition reaction of $C_2$–$C_4$-alkylene oxides with alcohols, phenols, amines or carboxylic acids, and (b) contain at least 2 polymerized alkylene oxide units, thereby agglomerating the primary particles of the water-in-oil polymer emulsion, then isolating the agglomerated polymer particles.

3. A process as claimed in claim 2, wherein the water-soluble monomers are acrylic acid, methacrylic acid, acrylamide, methacrylamide, N-vinylpyrrolidone, N-vinylimidazole, N-vinylformamide, 2-acrylamido-2-methylpropanesulfonic acid, hydroxyethyl acrylate, hydroxypropyl acrylate, N-methylolacrylamide or mixtures thereof.

4. A method of thickening an aqueous composition comprising combining the aqueous composition with the agglomerated particles of claim 1.

* * * * *